United States Patent [19]

Rountry

[11] Patent Number: 4,475,711
[45] Date of Patent: Oct. 9, 1984

[54] HIGH PRESSURE GAS VALVE

[75] Inventor: Robert A. Rountry, Canoga Park, Calif.

[73] Assignee: Honeywell Inc., Minneapolis, Minn.

[21] Appl. No.: 412,631

[22] Filed: Aug. 30, 1982

[51] Int. Cl.³ .............................................. F16K 25/00
[52] U.S. Cl. ........................................ 251/85; 251/86; 251/129; 251/357; 251/358
[58] Field of Search .................... 251/84, 85, 86, 88, 251/129, 356, 357, 358

[56] References Cited

U.S. PATENT DOCUMENTS

| | | | |
|---|---|---|---|
| 2,573,623 | 10/1951 | Stover | 251/85 |
| 2,735,047 | 2/1956 | Garner et al. | 251/86 |
| 2,842,333 | 7/1958 | Kent | 251/88 |
| 2,919,884 | 1/1960 | Meusy | 251/86 |
| 3,108,777 | 10/1963 | Ray | 251/129 |
| 3,276,741 | 10/1966 | Nielsen et al. | 251/357 |
| 3,310,277 | 3/1967 | Nielsen et al. | 251/84 |
| 3,625,481 | 12/1971 | Rattan | 251/356 |
| 3,671,009 | 6/1972 | Stampfli | 251/86 |
| 3,815,873 | 6/1974 | Hendrick | 251/85 |
| 4,327,767 | 5/1982 | Fehrenbach et al. | 251/85 |

Primary Examiner—George L. Walton
Attorney, Agent, or Firm—Clyde C. Blinn

[57] ABSTRACT

A valve assembly has a rigid valve plate with a hole therein for receiving a stem member of the valve actuator. A resilient valve member is mounted on the rigid valve plate by having a peripheral portion overlapping the valve plate. To prevent high pressure gas from entering the hole around the valve stem member through the valve plate to distort the resilient valve member, a solid backup member is mounted inside the resilient valve member adjacent the rigid valve plate.

5 Claims, 2 Drawing Figures

HIGH PRESSURE GAS VALVE

BACKGROUND AND SUMMARY OF THE INVENTION

For many years, valve assemblies have used a rigid valve plate which is loosely coupled to the stem of an actuator for supporting a resilient valve member or seat. The valve assembly might be moved against an outlet opening of the valve by a spring and when the actuator is energized, the valve assembly is lifted to open the valve. Such a valve assembly is intended to be loosely connected to the stem of the valve actuator to allow it to toggle about the actuator stem to compensate for misalignment of the valve assembly and valve seat. At the same time, the resilient valve member is made to slip on the valve plate in an easy assembling manner to reduce the cost of manufacture.

Such prior art valve designs are susceptible of distortion of the resilient valve member should the gas pressure on the inlet side above the valve assembly become excessive. Gas passing through the loose coupling around the hole in the valve plate to the underside of the resilient valve member distorts the valve member and possibly blooms the valve member through the valve outlet opening.

The present invention is concerned with the addition of a backup or sealing member adjacent the rigid valve plate and inside the resilient valve member to prevent the excessive gas pressure from distorting the resilient valve member.

DESCRIPTION OF THE PREFERRED EMBODIMENT OF THE INVENTION

Figure 1:
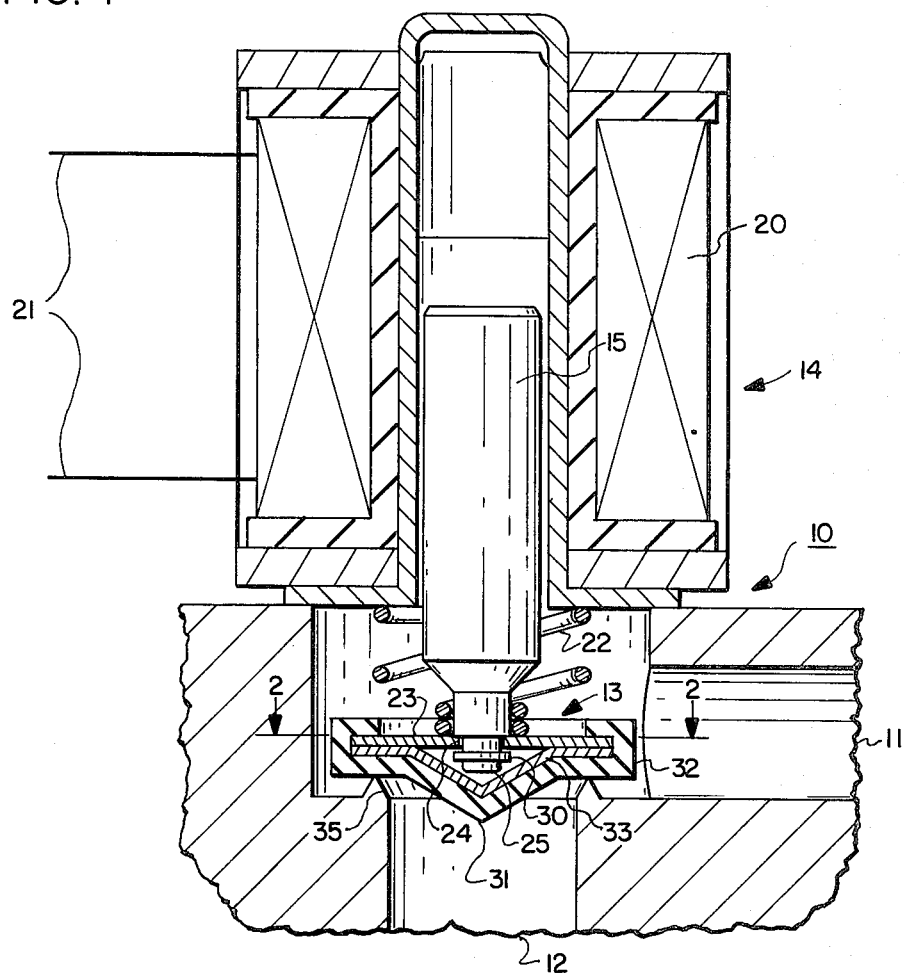
FIG. 1 is a cross-sectional view of a typical valve having an actuator and the valve assembly for controlling the flow of gas from an inlet out through the valve to an outlet.
Figure 2:
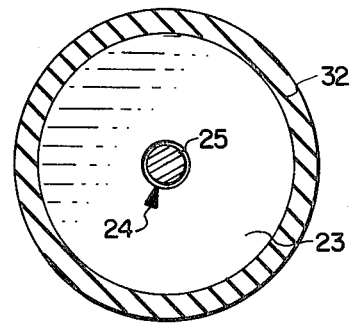
FIG. 2 is a vertical cross-sectional view of the valve assembly.

Valve 10 as shown in FIG. 1 has an inlet opening 11 and an outlet opening 12 through which the flow of gas under pressure is controlled by the position of a valve assembly 13. Valve assembly 13 is controlled by a conventional actuator 14 having a plunger 15 which is surrounded by electromagnetic coil 20 receiving power to control its operation from the inlet electrical leads 21. When the actuator is energized, member 15 is pulled upward against a spring 22 to lift valve assembly 13 and open the valve to allow gas to flow from inlet 11 to the outlet 12.

Valve assembly 13 has a rigid valve plate or backup plate 23 which might be a thin metal disc. Plate 23 has a hole or opening 24 for receiving a stem 25 connected to actuator member 15. Plate 23 is held on stem 25 by a conventional locking member or spring 30. A resilient valve member 31, which might be made of rubber, has a peripheral portion 32 for overlapping valve plate 23 to hold resilient valve member 31 on the valve assembly 13. Such an assembly provides for the attachment of stem 25 to plate 23 and then the mounting of flexible valve member 31 on valve plate 23 for a low cost of manufacture. When valve plate 23 and member 31 are assembled on stem 25, spring 22 bears against the plate to move the valve assembly in the downward, valve closed position as shown when actuator 14 is not energized. In the closed position valve member 32 closes outlet 12 by engaging a valve sealing ridge or seat 35 surrounding the opening of outlet 12.

Contained adjacent valve plate 23 and valve member 31 is a backup or sealing member 33 which is formed to lie against the upper or inside surface of resilient valve member 31. In the embodiment shown, "hat-shaped" backup plate 33 has a V-shaped center portion to allow for space for stem 25 and locking spring 31 which extends through valve plate 23. Backup plate 33 provides a seal so high pressure gas from the inlet cannot pass around rigid valve plate 23 whether through the opening of hole 24 or between the periphery of valve plate 23 and valve member 32 to reach the underside surface of resilient valve member 33 to distort the valve member.

OPERATION OF THE INVENTION

Valve assembly 13 is moved upward upon the energization of actuator 14 to lift valve member 32 off the outlet opening 12 or valve seat 35. When valve assembly 13 is in the closed position as shown, any excessive pressure on the inlet side through inlet 11 can only increase the force of the gas pressure on the backup plate 33 and thus hold the valve member 32 against the seat 35. No high pressure gas can pass through the opening 24 or around the periphery of valve plate 23 to reach the inside surface of valve member 32 to distort the valve member. The backup plate 33 provides a seal and allows for the use of the toggle type of connection between valve assembly 13 and actuator 15 with the use of the resilient type of valve member 33 which can be assembled readily to make a low cost valve assembly 13.

The embodiments of the invention in which an exclusive property or right is claimed are defined as follows:

1. A valve having a valve assembly comprising:
   a rigid valve plate having an opening therein,
   a resilient valve member having a peripheral means of attachment for removably securing said valve member to said valve plate,
   valve actuator stem member loosely connected through said opening to said rigid valve plate for moving said valve member against a valve outlet passage to stop the flow of gas from a high pressure inlet, said loosely connected valve member provides for proper alignment of said valve member and said outlet passage, and
   a backup member mounted between said valve plate and the inner surface of said valve member defining a space therebetween whereby said inlet gas under pressure passing through said hole is prevented from distorting said valve member and said valve stem member being free from applying any forces to said backup member at all times within said space to achieve proper alignment between said valve member and said outlet passage.

2. The invention of claim 1 wherein said backup member has a center portion shaped to form said space for a coupling means on said stem member to hold said valve member on said stem.

3. The invention of claim 1 wherein said rigid plate can be first attached to said stem member and said valve member with said backup member can be attached to said rigid plate.

4. The invention of claim 2 wherein said resilient valve plate is a thin disc, said backup member is a thin circular hat-shaped member, and said valve member is a circular flexible molded rubber seating member with an outer peripheral portion molded to extend over said disc to hold said valve member on said disc.

5. An improvement in a valve for controlling the flow of gas from a high pressure inlet passage to an outlet passage having a valve assembly comprising:
a rigid valve plate,
a resilient valve member having a peripheral means of attachment for removably securing said valve member to said rigid valve plate,
actuator means loosely connected to said valve plate through at least one opening in said valve plate, said actuator means adapted to move said valve member against a valve seat of the outlet passage in a valve closing position for closing said outlet passage to stop the flow of gas from said inlet passage, the improvement comprising:
a rigid sealing member mounted between said rigid valve plate and said inner surface of said valve member defining a space therebetween when said valve member is loosely assembled on said valve plate whereby the flow of high pressure gas past said rigid valve plate into said space to eliminate the distortion of said valve member by said high pressure inlet gas when said valve member is in said valve closed position and said actuator means being free from applying any forces to said rigid sealing member at all times within said space to achieve proper alignment between said valve member and said valve seat.

* * * * *